United States Patent
Ainslie

(10) Patent No.: US 8,112,184 B2
(45) Date of Patent: Feb. 7, 2012

(54) AUXILIARY POWER UNIT WITH DUAL USE OF SPEED SIGNALS

(75) Inventor: Walter Ernest Ainslie, Ramona, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 370 days.

(21) Appl. No.: 12/399,135

(22) Filed: Mar. 6, 2009

(65) Prior Publication Data

US 2010/0225122 A1    Sep. 9, 2010

(51) Int. Cl.
 *G05D 5/00* (2006.01)
 *G05D 3/12* (2006.01)
 *F02D 31/00* (2006.01)
 *F02D 35/00* (2006.01)

(52) U.S. Cl. ............ 700/290; 290/40 A; 290/40 B; 290/40 R; 700/287; 700/304; 60/773

(58) Field of Classification Search ............ 290/40 A, 290/40 B, 40 R, 1 R; 60/773; 700/290, 287, 700/304; *G05D 11/00, 17/00, 23/00, 13/00*
See application file for complete search history.

(56) References Cited

U.S. PATENT DOCUMENTS

| | | | | |
|---|---|---|---|---|
| 4,071,897 A * | 1/1978 | Groves et al. | | 700/290 |
| 4,920,277 A * | 4/1990 | Kuwabara et al. | | 290/40 C |
| 5,211,080 A * | 5/1993 | Leising et al. | | 475/123 |
| 5,527,004 A * | 6/1996 | Haggerty et al. | | 244/229 |
| 5,635,768 A | 6/1997 | Birch et al. | | |
| 6,735,951 B2 | 5/2004 | Thompson | | |
| 6,752,026 B1 * | 6/2004 | Hyde | | 73/861.15 |
| 6,777,822 B1 | 8/2004 | Suttie | | |
| 7,093,447 B2 | 8/2006 | Thompson et al. | | |
| 7,137,240 B2 | 11/2006 | Thompson | | |
| 7,337,605 B2 | 3/2008 | Hagshenas | | |
| 7,367,193 B1 | 5/2008 | Thompson | | |
| 2002/0074862 A1 | 6/2002 | Saga et al. | | |
| 2002/0126518 A1 | 9/2002 | Lazarovich | | |
| 2002/0138158 A1 | 9/2002 | Landreth | | |
| 2003/0131662 A1 * | 7/2003 | Lease | | 73/313 |
| 2004/0090071 A1 * | 5/2004 | Blackburn et al. | | 290/35 |
| 2007/0027655 A1 * | 2/2007 | Schmidt | | 702/188 |

* cited by examiner

*Primary Examiner* — Quyen Leung
*Assistant Examiner* — Terrance Kenerly
(74) *Attorney, Agent, or Firm* — Carlson, Gaskey & Olds, PC

(57) ABSTRACT

An auxiliary power unit has a speed sensor for sensing a speed of operation of the auxiliary power unit. The speed sensor sends a signal to an electronic control box. The electronic control box is operable to control the auxiliary power unit. A branch line is for communicating the speed signal to a health monitoring system. The branch passes through an electronic component that will isolate the speed signal as it passes beyond the component and to the downstream use, such that corruption at a downstream use will not pass back upstream to corrupt the signals used in the electronic control box.

7 Claims, 1 Drawing Sheet

AUXILIARY POWER UNIT WITH DUAL USE OF SPEED SIGNALS

This invention was made with government support under Contract No. N00019-06C0081 awarded by the United States Navy. The Government may therefore have certain rights in this invention.

BACKGROUND OF THE INVENTION

This application relates to an auxiliary power unit for an aircraft, wherein a single speed sensor has its sensed signal utilized by two distinct components.

Auxiliary power units are known, and are utilized in aircraft to provide power in addition to the aircraft's main jet turbine engines. Typically, an auxiliary power unit (APU) can include a small turbine engine. An APU is provided with an electronic control box that controls the operation of the APU. A speed sensor will typically send a speed signal from the APU shaft to the electronic control box, where it is utilized for various control functions.

In addition, more and more monitoring systems are being incorporated into the aircraft environment. One such system is an aircraft health monitoring system which may monitor overall health of several aircraft components. The aircraft health monitoring system also needs a speed signal from the APU. The use of redundant sensors would be expensive.

SUMMARY OF THE INVENTION

An auxiliary power unit has a speed sensor for sensing a speed of operation of the auxiliary power unit. The speed sensor sends a signal to an electronic control box. The electronic control box is operable to control the auxiliary power unit. A branch line is for communicating the speed signal to a health monitoring system. The branch passes through an electronic component that will isolate the speed signal as it passes beyond the component and to the downstream use, such that corruption at a downstream use will not pass back upstream to corrupt the signals used in the electronic control box.

These and other features of the present invention can be best understood from the following specification and drawings, the following of which is a brief description.

DETAILED DESCRIPTION OF THE PREFERRED EMBODIMENT

Figure 1:
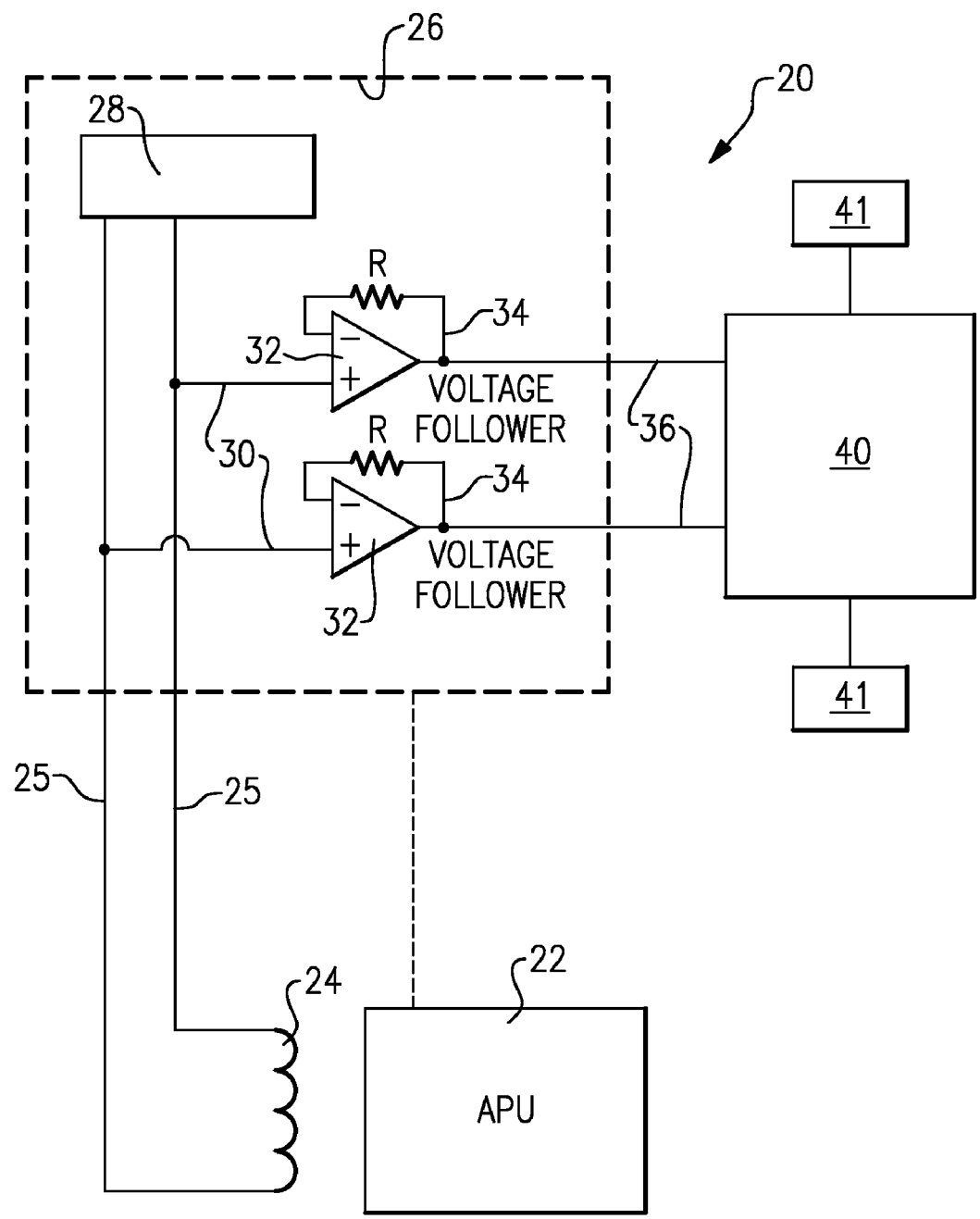
FIG. 1 schematically shows a system incorporating the present invention.

A system 20 includes an APU 22 which is utilized on an aircraft. A speed sensor 24 senses a shaft speed in the APU, and supplies a speed signal to an electronic control box 26 through a main signal line 25. The speed signal is utilized at 28, which is in turn part of the control box 26 for the APU 22. The speed signal is branched at 30 from the main signal line 25, and passed downstream through operational amplifiers 32 with a voltage follower 34, and then downstream through lines 36 to an aircraft health monitoring system 40. The aircraft health monitoring system 40 may be as known, and monitors operations of several other components on the aircraft, shown schematically as 41. Among the other components that report to and are analyzed by the aircraft health monitoring system may be the main rotor gear box, an environmental control system for the aircraft, and the main engines, and possibly others.

By placing the operational amplifier 32 and voltage follower 34 on lines 30, taking the speed signal to the aircraft health monitoring system 40, the system 20 ensures that corruption on the lines 36 will not travel back upstream to corrupt the speed signals utilized by the electronic control box 26. While operational amplifier 32 and voltage follower 34 are disclosed, other ways of isolating the upstream control function 28 from the downstream aircraft health monitoring system 40 may be utilized. A worker of ordinary skill in this art may be able to identify other electronic circuits that would provide this function.

While the APU 22 is illustrated utilized on an aircraft, this invention would have application in other auxiliary power unit applications, such as ground-based applications.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An auxiliary power unit comprising:
an auxiliary power unit, and a speed sensor for sensing a shaft speed of said auxiliary power unit;
said speed sensor sending a signal on a signal line to an electronic control box, said electronic control box being operable to control said auxiliary power unit; and
a branch line for communicating said speed signal from said signal line and to a health monitoring system, said branch line passing through an electronic component, which is downstream of a point where the branch line branches from the signal line, said component isolates the speed signal as it passes beyond said component and towards the health monitoring system, and such that corruption at a location downstream of the component will not pass back upstream to corrupt the speed signal used in the electronic control box.

2. The auxiliary power unit as set forth in claim 1, wherein said component is an operational amplifier and a voltage follower.

3. The auxiliary power unit as set forth in claim 1, wherein said health monitoring system is an aircraft health monitoring system.

4. The auxiliary power unit as set forth in claim 1, wherein said health monitoring system monitors the operation of components other than said auxiliary power unit.

5. An aircraft comprising:
an auxiliary power unit, and a speed sensor for sensing a shaft speed of said auxiliary power unit;
said speed sensor sending a signal on a signal line to an electronic control box, said electronic control box being operable to control said auxiliary power unit;
an aircraft health monitoring system; and
a branch line communicating said speed signal from said signal line and to said aircraft health monitoring system, said branch line passing through an electronic component, which is downstream of a point where the branch line branches from the signal line, said component isolates the speed signal as it passes beyond said component and to said aircraft health monitoring system, and such that corruption at a location downstream of said component will not pass back upstream to corrupt the speed signal used in the electronic control box.

6. The aircraft as set forth in claim 5, wherein said component is an operational amplifier and a voltage follower.

7. The aircraft as set forth in claim 5, wherein said aircraft health monitoring system monitors the operation of components other than said auxiliary power unit.

* * * * *